(12) United States Patent
Fagan

(10) Patent No.: US 7,225,757 B1
(45) Date of Patent: Jun. 5, 2007

(54) METHOD OF CLEANING SOILED BEDDING MATERIAL IN BARNS

(76) Inventor: Paul J. Fagan, P.O. Box 170, Dublin, TX (US) 76446

( * ) Notice: Subject to any disclaimer, the term of this patent is extended or adjusted under 35 U.S.C. 154(b) by 91 days.

(21) Appl. No.: 11/074,737

(22) Filed: Mar. 8, 2005

(51) Int. Cl.
*A01K 29/00* (2006.01)

(52) U.S. Cl. .................... 119/171; 119/172; 119/526; 209/172; 209/172.5

(58) Field of Classification Search ........ 119/171, 119/172, 526; 209/172, 172.5, 173, 725
See application file for complete search history.

(56) References Cited

U.S. PATENT DOCUMENTS

| | | | |
|---|---|---|---|
| 3,764,008 A | 10/1973 | Darley et al. | |
| 3,875,319 A | 4/1975 | Seckler et al. | |
| 4,161,428 A | 7/1979 | Gottschlich et al. | |
| 4,425,228 A | 1/1984 | Lynn et al. | |
| 4,539,097 A | 9/1985 | Kelterborn et al. | |
| 5,154,630 A | 10/1992 | Paul et al. | |
| 5,185,087 A | 2/1993 | Lister et al. | |
| 5,205,930 A | 4/1993 | Obrestad | |
| 5,582,727 A | 12/1996 | Foster | |
| 5,593,600 A | 1/1997 | Solomon | |
| 5,772,901 A | 6/1998 | Yu et al. | |
| 5,783,096 A | 7/1998 | Blaak | |
| 5,879,541 A | 3/1999 | Parkinson | |
| 5,950,839 A | 9/1999 | Wedel | |
| 6,106,717 A | 8/2000 | Hasegawa et al. | |
| 6,234,258 B1 | 5/2001 | Karigan | |
| 6,406,628 B1 | 6/2002 | Chang et al. | |
| 6,582,600 B1 | 6/2003 | Hashmi et al. | |

*Primary Examiner*—Peter M. Poon
*Assistant Examiner*—Willie Berry, Jr.
(74) *Attorney, Agent, or Firm*—Geoffrey A. Mantooth

(57) ABSTRACT

A method of cleaning bedding sand soiled with animal manure removes the bedding sand from an animal bedding area. An aqueous slurry of the bedding sand is made. The slurry is subjected to cyclonic action so as to separate the sand from the manure. The separated sand is then respread back into the animal bedding area for reuse. The clean bedding sand is free of organic contaminants such as manure, urine and milk. In addition, the bedding sand may contain inorganic contaminants such as clay and silt particles as well as fine particles which are undesirable in a bedding material. Processing the sand removes these inorganic contaminants and fine particles to produce a superior bedding sand for animals.

1 Claim, 3 Drawing Sheets

US 7,225,757 B1

METHOD OF CLEANING SOILED BEDDING MATERIAL IN BARNS

FIELD OF THE INVENTION

The present invention relates to methods for cleaning barns and other areas that house livestock.

BACKGROUND OF THE INVENTION

Dairies and feedlots house cattle in barns. The barns contain stalls for the cattle. The cattle are directed from their stalls to the feeding areas. In a dairy barn, milking cows are directed into a milking parlor.

The trend in cattle operations has been to increase the density of animals per acre of land. This increases the yield on fixed assets. Thus, today cattle operations have high cattle densities. With high densities, the problem of manure disposal arises. Cattle operations with low cattle densities simply allow the manure to naturally degrade. Cattle operations with high cattle densities do not have this luxury and must remove the manure from the cattle areas.

The stalls in cattle barns use bedding material to soften the ground and make the cattle more comfortable. In addition, the bedding material absorbs and mixes with the cattle waste. To clean the stall, the soiled bedding material is removed and replaced with clean bedding material.

Hay has traditionally been used as bedding material. Some other bedding materials include sawdust and mats. However, problems arise with these bedding materials in that they house pathogens which can lead to illness or infections in cows.

Sand is replacing hay and other bedding materials in many barns. Sand is comfortable for the cattle to bed in. Sand is cool in the summer and, when of the proper particle size, is less abrasive on the cows. Sand also drains well. Consequently, sand is drier and resists bacteria growth. Thus, sand is cleaner than traditional bedding material.

Dairy cattle in particular require sanitary bedding in order to minimize the occurrences of mastitis. Mastitis is an inflammation of the mammary gland caused by bacterial pathogens or injury. Mastitis reduces milk yields and alters the composition of milk. In many cases, mastitis causes permanent injury to the animal. In all cases, mastitis causes economic losses for the dairyman.

Unfortunately, soiled sand is harder to dispose of that soiled hay. While soiled hay can be composted, soiled sand cannot. The very characteristic that makes sand desirable as a bedding material, drainage, makes it difficult to compost, as composting the waste requires moisture.

In the prior art, the soiled sand is removed from the barn and disposed of or processed. When disposed of, it must be disposed of in compliance with environmental regulations. Some dairies buy land solely for sand disposal purposes and truck the soiled sand to the designated land for dumping. Soiled sand disposal adds to the cost of cattle operations and decreased the yield on fixed assets.

The soiled sand can also be processed. U.S. Pat. No. 5,950,839 separates the sand by agitating an aqueous sand slurry with paddles to draw off the finer organic components, and then conveys the sand and coarser organic components up an incline with a screw conveyor. The material is sprayed to separate the sand from the coarser organic components. The equipment required to process the sand is expensive and believed to require frequent maintenance.

SUMMARY OF THE INVENTION

It is an object of the present invention to provide a method for lowering the disposal costs of soiled bedding material, and in particular for sand bedding material.

The present invention provides a method for cleaning bedding sand soiled with animal manure. The bedding sand is removed from an animal bedding area. An aqueous slurry of the bedding sand is made. The slurry is subject to cyclonic action so as to separate the sand from the manure. The separated sand is respread back into the animal bedding area.

Thus, the present invention allows bedding sand to be cleaned and reused. This saves the dairyman in disposal costs of the soiled sand, and costs of buying new sand for bedding material, and also minimizes any environmental impact.

In accordance with one aspect of the present invention, the bedding sand contains inorganic contaminants. When the slurry is subjected to cyclonic action it further separates the inorganic contaminants from the sand. Thus, the present invention purifies sand by removing inorganic contaminants from the sand to produce a higher quality bedding material.

In still another aspect of the present invention, the bedding sand contains fine particles. When the slurry is subjected to cyclonic action, it separates the fine particles from the sand. Thus, a high quality bedding material is obtained because the bedding sand has a more uniform particle size by virtue of the fine particles being removed. Bedding sand with a more uniform particle size is highly desired as it drains well and minimizes pathogen populations.

In accordance with another aspect of the present invention, the bedding sand is removed from animal bedding areas by vacuuming the bedding sand.

In accordance with another aspect of the present invention, the bedding sand is removed from the animal bedding areas by washing the bedding sand from the bedding areas.

In accordance with still another aspect of the present invention, the manure that is separated from the sand is in an aqueous slurry. The manure slurry is subjected to a second cyclonic action so as to dewater the manure. Once the manure is dewatered, it can be used as a compost material.

DESCRIPTION OF THE PREFERRED EMBODIMENT

Figure 1:
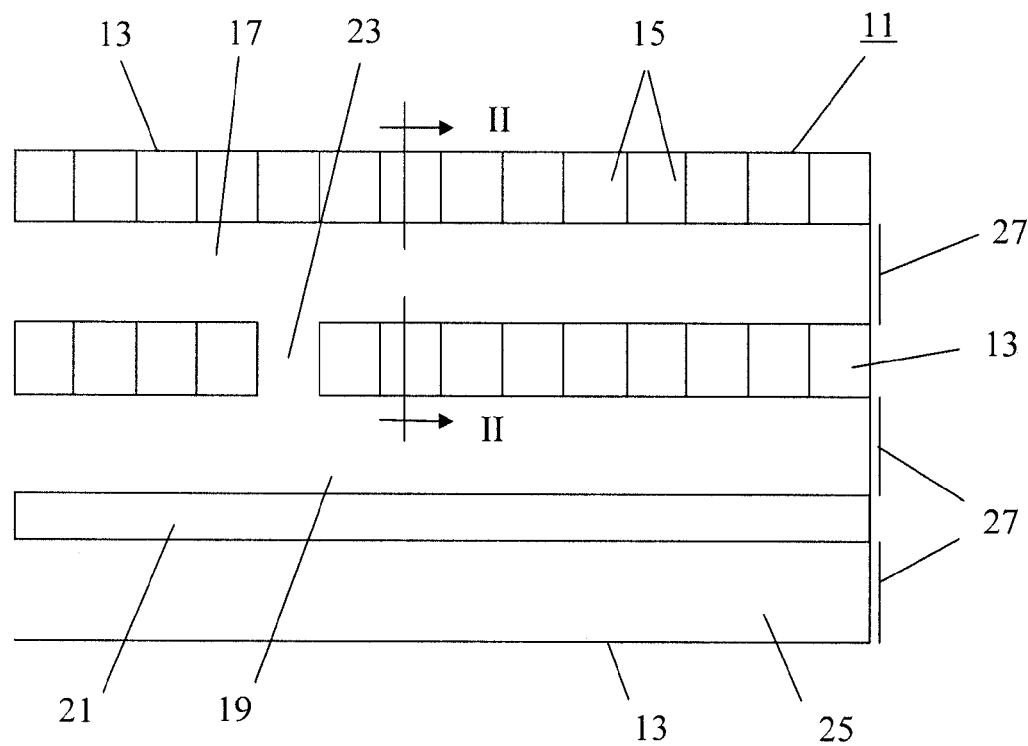
FIG. 1 is a plan view of a portion of a dairy barn.
Figure 2:
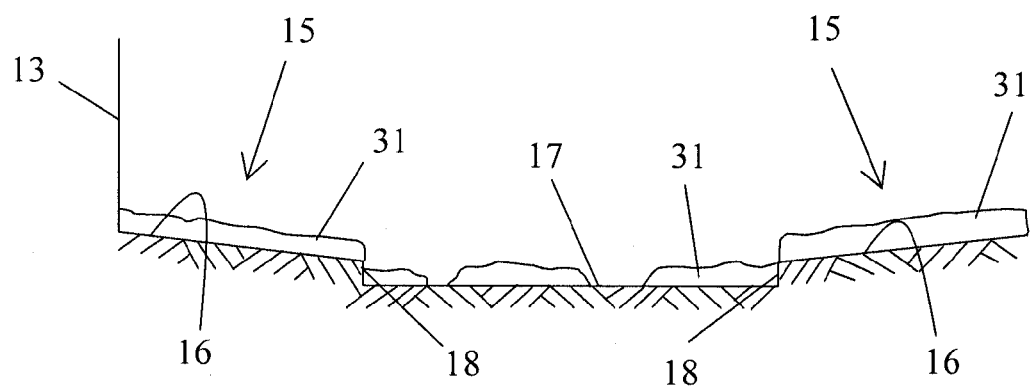
FIG. 2 is a cross-sectional view, taken through lines II—II of FIG. 1.

FIGS. 1 and 2 show an example floor plan of part of a dairy barn 11. The barn is enclosed by a roof and walls 13 to shelter the animals from the weather.

The barn 11 has rows of stalls 15 that form bedding areas, with each stall receiving an animal. The stalls can be tie stalls or free stalls. Each stall may have a front wall or rails (closest to the head of the animal) and side rails. The back of the stall can be open or gated. The floor 16 of each stall has a slight slope downward from the front to the back to assist in draining. The backs of the stalls open to a manure alley 17, which alley runs the length of barn. There is a drop 18 from the back of each stall to the manure alley 17. The manure alley 17 has a slight slope to the end of the barn to assist in draining. The barn may also be equipped with a feeding alley 19, which is adjacent to a feeding bunk 21. The cows access the feeding alley 19 from the manure alley 17 by way of a passage 23, which is located between the stalls in the row of stalls that is between the manure alley 17 and the feeding alley 19. A drive-through alley 25 extends adjacent to the feeding bunk 21. Doors 27 are provided at the ends of the alleys to allow ingress and egress into the barn.

The stall floors 16 and alleys can be made of concrete.

The floors 16 of the stalls 15 are covered with sand 31 as a bedding material. While many types of sand are used as bedding material, depending upon availability and cost, there are particular types of sand which are particularly suitable. For example, mortar sand and concrete sand are well suited due to uniform particle size and relatively large particle size. Sand with uniform particle size has good drainage characteristics. Concrete sand and mortar sand are washed sands, which produces a relatively uniform particle size and a limited number of fines. Fines, or sand particles of small size, is less desirable a bedding material because it has poor drainage characteristics and is more likely to compact in the stalls and is therefore less comfortable to a cow. The majority of the sand particle sizes preferred by dairies falls between the sieve mesh size (mm) of 0.2 to 1.0. Fines are less than 0.1 or 0.2 mm.

The bedding sand 31 is several inches thick. In many dairy barns, the bedding sand is 6 inches thick. A retaining wall, or lip (not shown) may be added at the manure alley 17 end of the stall 15 so as to maintain the sand in the stall. There is typically sand lying in the manure alley; the sand is kicked by the cows from the stalls or dropped during operations that spread the sand in the stalls.

Bedding sand 31 can be used in a number of bedding areas besides barns. The bedding areas can be inside a shelter such as a barn, or outside in unsheltered areas.

The bedding sand 31 is periodically changed by removing it from the stalls and replacing it with clean sand. After the cows bed on the sand 31, it becomes soiled with manure, urine and milk. The soiled sand can be removed from the barns in various ways. For example, one way is to wash the soiled sand out with water. The soiled sand is shoveled from the stalls 15 into the manure alley 17. Water is then used to wash the soiled sand down the manure alley into a collection pit or tank. Another way to remove soiled sand from the stalls is by vacuuming the sand from the stalls. A vacuum hose picks up the soiled sand from the stalls and the manure alley and conveys it to a tank. Water is added to the tank to make a slurry. Still another way to remove the soiled sand is to move it from the stalls into the manure and then to push the soiled sand down the manure alley to a collection area outside the barn (typically a concrete apron). A tractor equipped with a blade or a bucket can perform this task. Once outside the barn, the soiled sand is loaded into the tank by a front end loader or other piece of equipment. Water is added to make an aqueous slurry.

After removal and collection, the soiled sand is then processed. Processing cleans the sand by removing the organic contaminants (such as manure, urine and milk). In addition, processing purifies the sand by removing inorganic contaminants (such as silt and clay particles). The sand is purified because the removal of organic contaminants makes the sand less likely to harbor pathogens.

Figure 3:
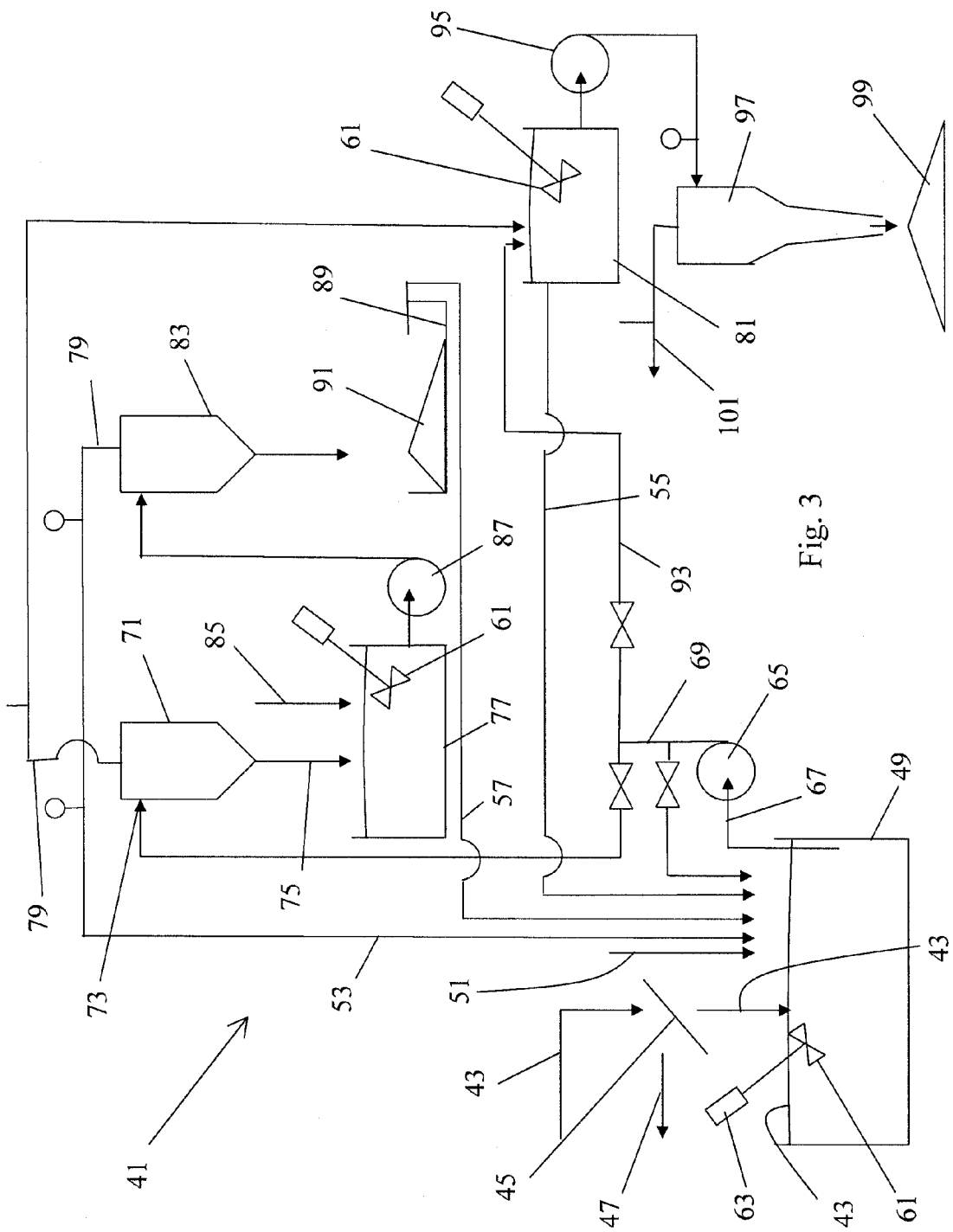
FIG. 3 is a schematic diagram of the apparatus of the present invention, in accordance with a preferred embodiment.

The equipment 41 to process the soiled sand is shown in FIG. 3. The soiled sand is mixed with water to form an aqueous slurry 43.

The slurry 43 is passed through a screen 45 for removing coarse solids 47 such as hay. The slurry passes into an initial or first container 49, such as a tank or pit. The slurry 43 in the first container 49 has a consistency of water to dry matter, with the dry matter comprising sand and solid contaminants. In the preferred embodiment, the consistency is, by volume, 8–12% solids with the remainder liquids. The consistency is measured by taking a sample, and allowing the solids to settle. The water is then removed and the solids are allowed to dry.

As an alternative, the soiled sand can be added to the container 49 in a relatively dry state, with the aqueous slurry 43 made up in the container 49.

In order to maintain the consistency of the slurry in the desired range, either water 51, organic material 53, 55 or sand may be added to the first container 49 independently of the slurry feed 43. Because the solids tend to settle to the bottom of the container, the contents are agitated. Various mechanisms can be used to agitate the contents of the containers, such as paddles, jets, etc. In the preferred embodiment, the agitators 61 in the containers are screws or propellers driven by motors 63.

A pump 65 has an input 67 that draws the slurry 43 from the first container 49. The pressurized slurry exits the pump outlet 69 where valves direct the slurry into an input 73 of a first cyclone 71. The input 73 is on the side of the cyclone. In the preferred embodiment, the slurry is provided to the first cyclone at a pressure of 3–7 psi (pressures listed herein are gauge pressures) and a volume of 350–440 gpm (gallons per minute). The pressures and volumes may be adjusted according to the contaminant load in the sand. The slurry is subjected to cyclonic action in the first cyclone 71. The input stream in a cyclone creates a centrifugal force that separates components based upon the specific gravity and size of particles. Particles with a high density and large particle size (heavy portion 75) have larger centrifugal forces and stay against the cyclone wall, traveling down the length of the cyclone and out of the bottom. Particles that are less dense and smaller in size form the lighter portion and swirl along the interior portions of the cyclone. The lighter portions 79 travel up out of the top of the cyclone. The bulk of the liquid that is injected into the cyclone forms the lighter portion 79 and travels up out of the top of the cyclone.

What exits out of the bottom of the first cyclone 71 is mostly sand with some contaminants. In addition, some water exits out of the bottom of the cyclone. The heavy portion 75 goes into a second container 77 for further processing to remove more of the contaminants. The lighter portion 79, which is mostly water and most of the contaminants, flows into a third container 81.

The heavy portion 75 is significantly dewatered, so water 85 is added to the second container 77. The consistency of the sand slurry in the second container 77 is about 8–12% solids, with the remainder liquids. Of course the dry matter is primarily sand. The second container 77 is provided with an agitator 61 to mix the sandy slurry and to maintain the consistency. A second pump 87 withdraws the sandy slurry and injects it into the input of the second cyclone 83. In the preferred embodiment, the second cyclone input has a pressure of 3–7 psi and volume of 150–200 gpm. In the preferred embodiment, the second cyclone has a lower input pressure than the first cyclone 71. The sand 91, which is the heavy portion, exits the bottom of the cyclone 83 and into a draining area 89. The water drains from the sand 91 and is recirculated by a line 57 to the first container 49.

The heavy portion in the draining area is almost exclusively sand 91. In the preferred embodiment, the heavy portion is 99% sand by volume, with the remainder being inorganic or organic material. The sand 91 has a more uniform particle size as well. Many of the fine particles of sand (which are undesirable for bedding) are separated out of the sand in the cyclones 71, 83. Thus, the sand 91 is a high quality bedding material, because it is essentially free of organic contaminants, essentially free of inorganic contaminants, and has a more uniform particle size. The sand 91 drains well, is more hostile to pathogens and is comfortable for the cows to bed on. Consequently, the sand 91 is essentially mortar sand or concrete sand.

The sand can be further cleaned by injecting chlorine gas into the piles of sand 91. The gas is chlorine dioxide and permeates the piles.

The lighter portions of the second cyclone 83 include water and contaminants. This contaminant slurry 79 is provided to the third container 81. Alternatively, the slurry from the top portion of the second cyclone 83 can be provided to the first container 49 to change the consistency of the first container effluent. The routing of the slurry from the top portion of the second cyclone into the first container can occur continuously (for example, using a flow splitter, such that a small quantity is diverted to the first container with the remainder flowing into the third container) or intermittently through the use of valves.

An agitator 61 is provided for the third container 81. Consistency of the slurry in the third container is maintained by the agitator. In the preferred embodiment, the consistency of the slurry in the third container is about 8–12% dry matter with the remainder being water. The dry matter is mostly manure, with some inorganics such as clay, silt, etc. Line 93 extends from pump 65 through a valve to the third container.

A pump 95 has an input that draws from the third container 81 and an output connected to an input of the third cyclone 97. In the preferred embodiment, the slurry is provided at about 30 psi and a volume of 350–390 gpm. The third cyclone 97 processes the organic matter by subjecting it to cyclonic action and also dewaters the organic material. The solids 99 exit the bottom of the cyclone while the liquid 101 exits the top. Lister, U.S. Pat. No. 5,185,087, the complete disclosure of which is incorporated herein by reference, describes the processing of cow manure with a cyclone. The solids can be further dewatered by allowing the solids to passively drain, by pressing the solids in a mechanical press or by heating the solids such as in an oven or a dryer.

The solids can be composted by storing the solids in piles. The internal temperatures of the compost piles are monitored. When the temperature of the pile reaches 140 degrees Fahrenheit, the pile is turned. By repeating the heating and turning steps, bacteria and weed seeds are destroyed.

The liquid component 101 may be treated to remove phosphorous, which is considered a pollutant. NaOH, or some other alkali, is mixed with the liquid component to raise the pH to 9 or greater. Then, magnesium chloride (or aluminum hydroxide) is added to the liquid component and the liquid is agitated. The additive reacts with the phosphorous to form struvite. The liquid is directed into a tank, pond, or other settling container, wherein the struvite floats to the top. The struvite can then be removed through the use of a skimmer or other devices.

The present invention removes about 95% of the soluble phosphorous from the water. The concentration of phosphorous in the water is sufficiently low so that the water does not need to be kept in a lagoon. Instead, no additional processing or wait time is required. The water can be used for cattle or can be applied to the land for agricultural purposes.

Figure 4:
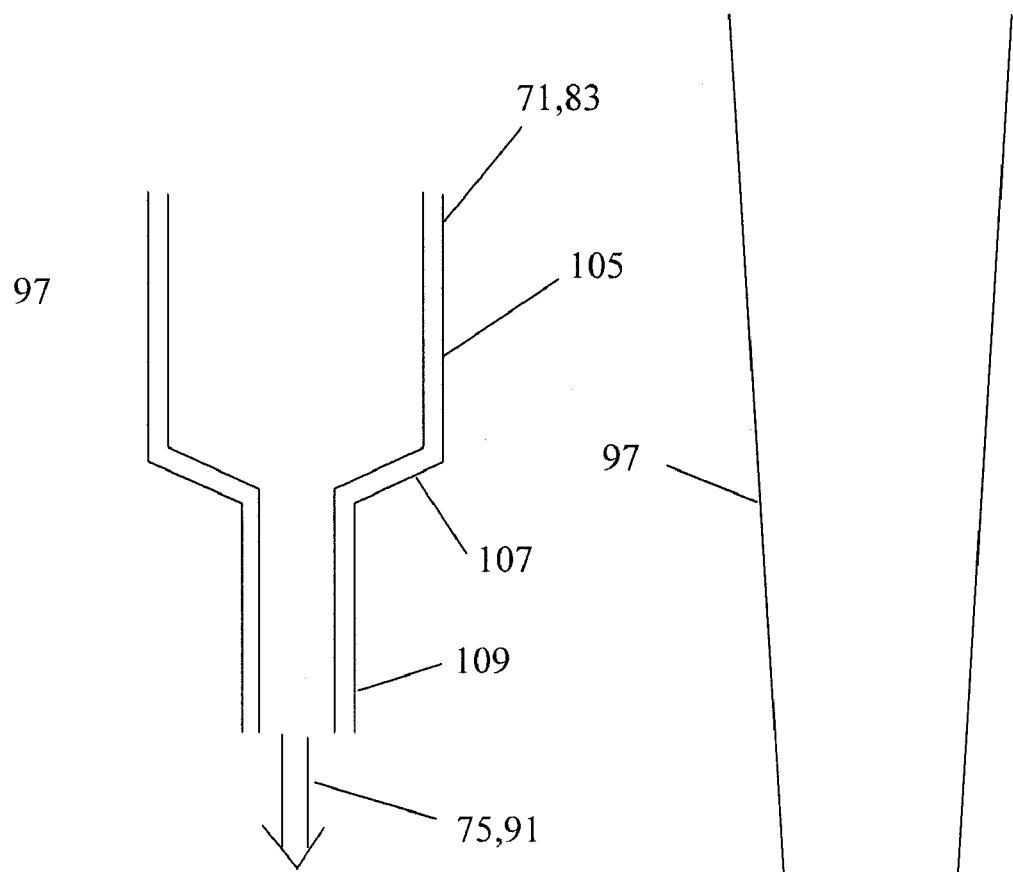
FIG. 4 is a longitudinal cross-sectional view of one of the desanding hydrocyclones.

Referring to FIG. 4, the first and second cyclones 71, 83 are metal (such as steel) with removable ceramic inner liners 103. The ceramic liners 103 provide protection from the abrasiveness of the sand. The first and second cyclones 71, 83 have an upper cylindrical portion 105, an intermediate converging portion 107 and a lower cylindrical portion 109. The inside diameter of the lower cylindrical portion 109 is about a third the inside diameter of the upper cylindrical portion. In the preferred embodiment, the inside diameter of the upper cylindrical portion 105 is 10 inches, the inside diameter of the lower cylindrical portion 109 is 3 inches and the length of each cylindrical portion 105, 109 is 9–11 inches. The first and second cyclones 73, 83 are substantially similar to each other.

Figure 5:
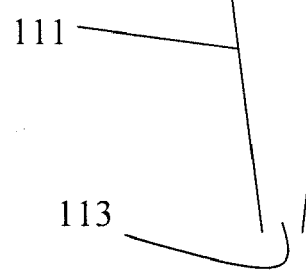
FIG. 5 is a longitudinal cross-sectional view of the dewatering hydrocyclone.

The third cyclone 97 (see FIG. 5) need not be metal and can be made of plastic such as urethane. The third cyclone 97 has an upper portion and a lower apex 111. The upper portion is 56 inches long and about 11 inches in inside diameter, at the top, tapering to about 5 inches at the apex. The apex is 14–15 inches long and tapers to about 1½ inches at the bottom opening 113. T*hus*, the first and second cyclones 71, 83 are shorter and blunter than the third cyclone 97.

Also, the first and second pumps 65, 87 are provided with rubber impellers to provide durability with respect to the sand.

The clean bedding sand 91 is transported back to the barn and spread into the stalls. This is typically done by using a dump truck and front end loader. The sand can be spread evenly in the stalls by use of a rake.

Cleaning the sand can result in a loss of the overall volume of the sand. Make-up sand can be added to the bedding material to make up the loss. This make-up sand can be a bulk sand or low quality sand purchased from the supplier and typically is not a washed sand such as a mortar sand or concrete sand. The make-up sand likely has inorganic contaminants. By mixing in the lower quality make-up sand with the clean, high quality, bedding sand 91, the inorganic contaminants are diluted. The inorganic contaminants are removed when the bedding sand becomes soiled and next removed from the barn and processed by the cyclones 71, 83. Alternatively, if the make-up sand is heavy-laden with contaminants, it can be processed first by the cyclones before being applied to the barn as bedding material. The make-up sand is merely added to the first container 49.

One advantage of the present invention is that high quality bedding material can be obtained economically and reused economically. The present invention is able to take low quality sand, that is sand with inorganic contaminants and fine particles, and remove these undesirable components to produce a sand of uniform particle size and free of contaminants. The high quality bedding sand reduces the incidence of mastitis, and the cows are healthier and more comfortable.

Another advantage of the present invention is that a dairy operator need not worry about sand disposal, as the bedding sand can be reused. The dairy operator can more easily comply with environmental regulations relating to manure disposal as the manure is not intermingled with the sand, which sand adds to the bulk of the waste.

The process of the present invention can be practiced at a location that close to or adjacent to the dairy barn. The equipment 41 can be located relatively close to the dairy barn in order to minimize movement of the bedding sand. Alternatively, the equipment can be set up in a central location so as to service a number of dairy barns. In this case, the bedding sand is transported to and from the dairy barns and the processing equipment by way of trucks.

The foregoing disclosure and showings made in the drawings are merely illustrative of the principles of this invention and are not to be interpreted in a limiting sense.

The invention claimed is:

1. A method of cleaning bedding sand soiled with animal manure, comprising the steps of:

a) collecting the bedding sand and manure by removing the bedding sand from an animal bedding area by washing the bedding sand from the bedding area b) making an aqueous slurry of the bedding sand;

c) subjecting the slurry to cyclonic action so as to separate the sand from the manure;

d) respreading the separated sand back into the animal bedding area.

* * * * *